June 17, 1952  F. FENTON  2,600,862

INFLATION VALVE

Filed June 11, 1947

INVENTOR
FRANK FENTON
BY
Ely & Frye
ATTORNEY

Patented June 17, 1952

2,600,862

UNITED STATES PATENT OFFICE 2,600,862

INFLATION VALVE

Frank Fenton, Akron, Ohio, assignor to The Sun Rubber Company, Barberton, Ohio, a corporation of Ohio Application June 11, 1947, Serial No. 753,911

9 Claims. (Cl. 273—65)

The present invention has for its object improvements in the construction of valves such as employed for inflating hollow articles, and while the invention has wide utility, it is primarily intended for use with inflated balls. Play balls, beach balls and the like are often inflated orally and for this purpose it has been the custom to provide a small tubular section of flexible pipe which is tied or knotted on the outside of the ball.

One objection to valves of this type has been that the soft rubber tubes are often mutilated or torn so that the ball becomes unserviceable and has to be discarded. One object of the invention is to design and construct the valve mechanism so that the flexible and vulnerable inflating tube may be replaced in the event that it is badly damaged.

Another objection to valves formerly used for this purpose is that when knotted or tied, they protrude beyond the outer surface of the ball or create a hump which makes the ball out of round and subjects the valve to injury. In the improved valve, a pocket is provided in a main valve housing in which the end of the valve may be tucked away so that it is wholly inside of the outer perimeter of the ball.

The valve housing to which reference will be made is also adaptable for the type of inflation known as the needle operation in the event this method of inflating is desired. Such a method of operation is disclosed in applicant's prior Patent No. 2,387,433, dated October 23, 1945.

Other objects and advantages such as ease of manufacture, reduction in cost and simplicity are attained as will be apparent from the following detailed description taken in connection with the drawings. It will be understood that the invention is not in any way limited to the specific uses stated or to the details shown and described, but may be modified and improved within the scope of the invention as set forth in the appended claims.

In the drawings in which the best known and preferred form of the invention is illustrated:

Figure 1:
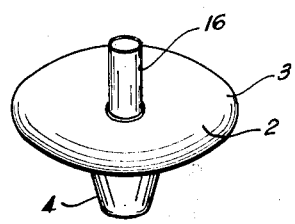
Fig. 1 is a perspective view of the valve assembly removed from the interior of the article.

In the drawings, I represents the outer wall of any form of ball or other article which is inflated when in use. This may be a rubber and fabric structure or it may be merely the rubber wall of a bladder.

To the inner surface of the article 1 is attached, usually by a cemented bond, the valve housing indicated as a whole by the numeral 2. This is made of a molded rubber stock having some stability so that it is not too easily deformed. In the normal or preferred construction, the body is formed with a circular or oval patch 3 which is brought to a tapered or feather edge.

Rising from the center of the patch is a projection or body 4 which constitutes the main valve housing and is usually conical in shape. Leading from the outer face of the body is a passage 5 which is in register with a corresponding passage in the article 1 and leads to an inner chamber 6. Preferably, although not necessarily, this chamber 6 is cone-shaped so as to provide an overhanging wall 7 to retain the twisted valve stem when the article is inflated.

From the innermost point of the chamber 6 a second passage 8, which is the same diameter as the passage 5, leads to an inner chamber 10 which is preferably of the same shape as the chamber 6 and is likewise provided with an overhanging rim or wall 11. From the base of the inner chamber a reduced passage 12 leads to the interior of the article.

The valve proper is designed to be removably held and interlocked within the chamber 10. The valve proper is indicated as a whole by the numeral 15. It is formed of a softer and better grade rubber stock so that it is quite flexible. The member 15 comprises an elongated tubular element 16 hollow throughout, which, when in the position shown in Fig. 2, projects substantially above the outer wall of the article. In referring to the length of the tube 16, the word "substantially," as employed in this specification and in the claims to follow, is intended to mean that the tube projects from the valve housing a sufficient amount for convenient oral inflation and that its length, relative to its diameter, contributes to easy folding of the tube. The lower or inner end of the member 15 is closed in at the base of the tube 16 and a narrow passage 18 is provided therein to register with the passage 12. The lower or inner end of the member 15 is provided with a head 20 which is of a contour to fit the inner chamber 10 and has a ledge 22 which fits beneath the rim 11 on the valve housing.

Figure 2:
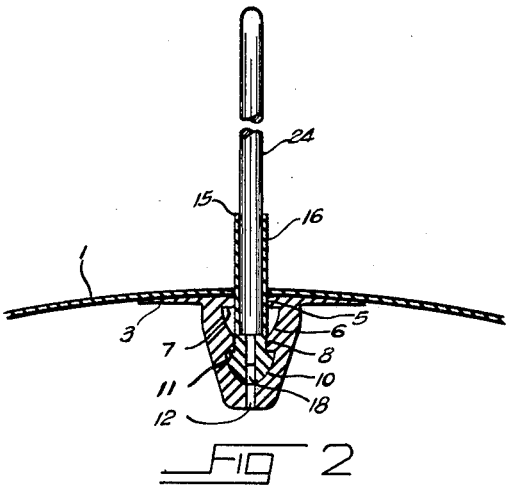
Fig. 2 is a cross-section through the valve attached to the interior of a ball, this view showing the position of the valve as in inflating the ball.

It will be seen that when the valve proper and the housing are assembled in the manner as shown in Fig. 2, the enlarged head is contained within the chamber 10 so that the valve is interlocked in the housing. However, a strong, direct pull exerted on the projecting end of the tubular valve will cause the head of the valve and the wall 11 to yield sufficiently so that the valve 15 may be removed. In the event the valve proper has been injured so that it is no longer serviceable, a new one may be inserted in its place. This may be done by using a blunt tool or pusher, indicated at 24 in Fig. 2.

Figure 3:
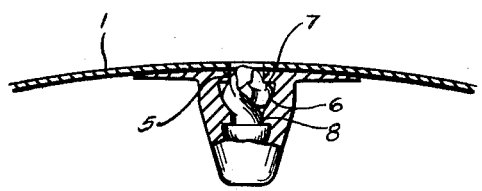
Fig. 3 is a similar cross-section showing the knotted valve seated in the pocket or recess in the housing.
Figure 4:
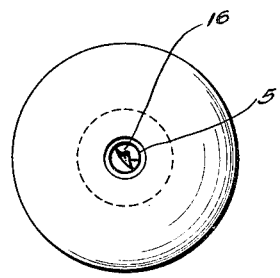
Fig. 4 is a plan view of the assembly with the valve in the condition of Fig. 3.
Figure 5:
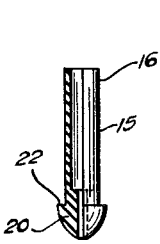
Fig. 5 is a view partly in section of the valve proper.

Oral inflation is accomplished by placing the projecting end of the tube in the mouth and when sufficient pressure has been attained, the flexible tube 16 is pressed together by the fingers and twisted or knotted so as to retain the air in the article. The knotted or twisted tube is then tucked through the hole 5 and into the chamber 6 which holds the twisted tube beneath the rim 7. In all normal cases the twisting or knotting of the tube 16 and tucking it into the chamber is sufficient to hold air at the relatively low pressures employed in many types of play balls. The twisted condition of the tubular section of the valve is illustrated in Figs. 3 and 4.

Figure 6:
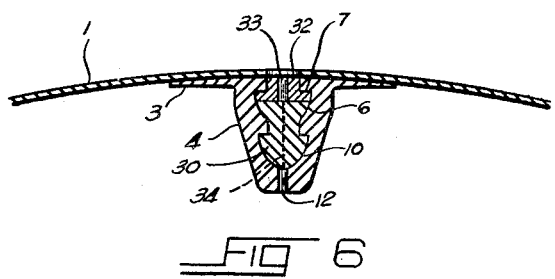
Fig. 6 is a view showing how the housing may be adapted for needle inflation.

It is sometimes desired to use the well known needle operation for inflation. In such a case the valve 15 is removed altogether and the chamber 10 and part of the chamber 6 is filled with a heavy air-retaining mastic compound. Such a body of mastic is illustrated at 30 in Fig. 6. To retain the mastic in position, a rubber disk 32 having a hole 33 for the insertion of the needle is fitted within the housing so that it lies under and is retained by the wall 7. The path of the needle is indicated by the dotted lines 34 in Fig. 6.

It will be seen that the objects and purposes of the invention have been attained by a very simple and yet effective organization of elements, but that the specific shape and design of the elements may be modified without losing any of the beneficial properties of the invention.

What is claimed is:

1. In an article having an inflation opening, a housing attached to the inner wall of the article at the inflation opening, said housing having a through passage leading from the inflation opening to the interior of the article, said passage comprising inner and outer chambers in alignment, each chamber being provided with an overhanging rim, and a removable valve member comprising a flexible rubber tube and an enlarged head on the inner end of the tube engaged beneath the rim about the inner chamber when the valve member is in position with a portion of the tube projecting substantially outwardly of the article, the rim about the outer chamber being adapted to retain the projecting portion of the tube in twisted condition below the periphery of the article.

2. A valve for the inflation of a hollow article, comprising a valve housing having a portion adapted to be attached to the inner wall of the article, said housing having a main body projecting from said portion and said housing having a through opening, including an inner and outer chamber, and a valve member comprising an enlarged head seated in the said inner chamber, and a flexible, tubular portion extending through said outer chamber and of a length to extend substantially outwardly of said housing, said outer chamber being of sufficient volume to receive and hold the tubular portion of said valve member in twisted and folded condition.

3. A valve for the inflation of a hollow article, comprising a housing and valve member, said housing having a flange adapted to be attached to the inner wall of the article, and a main body projecting from the said flange and having inner and outer chambers connected by a restricted passage, a restricted air passage leading from the exterior of the housing to the said outer chamber, a restricted air passage leading from the said inner chamber to the exterior of the housing, said valve member comprising a flexible tube, a head on one end of the tube normally interlocked within the inner chamber, said tube being of a length to extend a substantial distance outwardly of the housing, and said outer chamber having a volume sufficient to snugly receive the said tube behind the first-mentioned, restricted air passage when said tube is in twisted and folded condition.

4. A valve for the inflation of a hollow article having an inflation opening, said valve comprising a housing adapted to be attached to the interior wall of the article at the inflation opening, said housing having a through passage including an enlarged, inner chamber, and a flexible inflation tube foldable upon itself to prevent passage of air and with an enlargement on one end nested in said chamber and removably interlocked therewith, and said tube being of a length to extend a substantial distance outwardly of the said housing.

5. A valve for the inflation of a hollow article having an inflation opening, said valve comprising a housing adapted to be attached to the interior wall of the article at the inflation opening, and having an enlarged, interior chamber, said housing having air passages communicating from said chamber to the exterior of said housing, and an inflation tube having a formation nested in the said chamber to removably interlock said tube in said housing, said tube extending through one of said air passages and substantially exteriorly of said housing and having a wall structure sufficiently flexible, relative to its length, whereby the tube may be twisted and folded upon itself to prevent passage of air therethrough.

6. A valve for the inflation of a hollow article having an inflation opening, said valve comprising a housing adapted to be attached to the interior wall of the article at the inflation opening, said housing having a through passage communicating with an enlarged, central chamber, defined in part by an overhanging rim in the housing, and an inflation tube having a headed portion received beneath said rim to removably interlock said tube in said housing, and said tube being of a length to extend substantially outwardly of said housing and being sufficiently flexible that the tube may be twisted and folded upon itself for lodgment in said housing.

7. A valve for the inflation of a hollow article having an inflation opening, said valve comprising a housing adapted to be attached to the interior wall of the article at the inflation opening, and a flexible inflation tube, said housing having a chamber with an overhanging, flat rim, a head formed on the inner end of the tube and received beneath said rim to removably interlock the tube in the housing with a substantial portion of the tube extending outwardly of the housing, and an air passage through said housing communicating with the passage in said tube.

8. In a hollow article having an inflation opening, a valve housing attached to the inner wall of said article at the inflation opening, a valve comprising a tube, the inner end of which is detachably retained in the housing and is in communication with the interior of the article, and a portion of the tube extending substantially outwardly of the article, said tube being sufficiently flexible for twisting and folding upon itself to prevent passage of air, and said housing having a chamber of sufficient volume to receive the free end of said tube when in folded condition.

9. In a hollow article having an inflation opening, a housing attached to the inner wall of said article at the inflation opening, a valve comprising a tube, the inner end of which is detachably retained in the housing and is in communication with the interior of the article, and a portion of the tube extending substantially outwardly of the article, said tube being sufficiently flexible for twisting and folding upon itself to prevent passage of air, and said housing having a chamber with an overhanging wall, said chamber being of sufficient volume to receive the free end of said tube, when in folded condition, in locked relation behind said overhanging wall.

FRANK FENTON.

REFERENCES CITED

The following references are of record in the file of this patent:

UNITED STATES PATENTS

| Number | Name | Date |
| --- | --- | --- |
| Re. 17,057 | Voit | July 31, 1928 |
| 1,867,443 | Dieterie | July 12, 1932 |
| 1,913,454 | Predmore | June 13, 1933 |
| 1,927,725 | Tompkins | Sept. 19, 1933 |
| 2,151,466 | Eken | Mar. 21, 1939 |
| 2,295,804 | Olson | Sept. 15, 1942 |
| 2,318,115 | Tubbs | May 4, 1943 |
| 2,349,463 | Riddell | May 23, 1944 |